United States Patent

Brugerolle

[11] Patent Number: 5,421,164
[45] Date of Patent: Jun. 6, 1995

[54] PROCESS AND INSTALLATION FOR THE PRODUCTION OF ULTRA-PURE NITROGEN UNDER PRESSURE

[76] Inventor: Jean-Renaud Brugerolle, 9 rue des Banches, 75016 Paris, France

[21] Appl. No.: 132,301

[22] Filed: Oct. 6, 1993

[30] Foreign Application Priority Data

Oct. 9, 1992 [FR] France .................. 92 12012

[51] Int. Cl.[6] .................................................. F25J 3/00
[52] U.S. Cl. ............................................. 62/21; 62/25; 62/37; 62/40
[58] Field of Search .......................... 62/21, 25, 37, 40

[56] References Cited

U.S. PATENT DOCUMENTS

| | | | |
|---|---|---|---|
| 4,853,015 | 8/1989 | Yoshino | 62/40 |
| 5,157,927 | 10/1992 | Darchis et al. | 62/40 |
| 5,209,070 | 5/1993 | Darredeau | 62/37 |
| 5,224,336 | 7/1993 | Agrawal et al. | 62/24 |

Primary Examiner—Ronald C. Capossela

[57] ABSTRACT

According to this process, there is produced gaseous nitrogen of medium purity under substantially the production pressure. This nitrogen is sent to the base of a distillation column (11) provided with a head condenser (23). The head condenser is cooled by means of liquid in the base of the low pressure column and if desired the liquid nitrogen at medium purity contained in a reservoir (10). Ultra-pure nitrogen is withdrawn as a product from the head of the column, and during periods of no production of nitrogen of medium purity and during periods in which the demand for ultra-pure nitrogen exceeds this production, there is sent to the base of the column gaseous reserve nitrogen of medium purity obtained from the liquid nitrogen of the reservoir and there is sent into the head condenser a relatively large flow of liquid nitrogen from this reservoir.

9 Claims, 1 Drawing Sheet

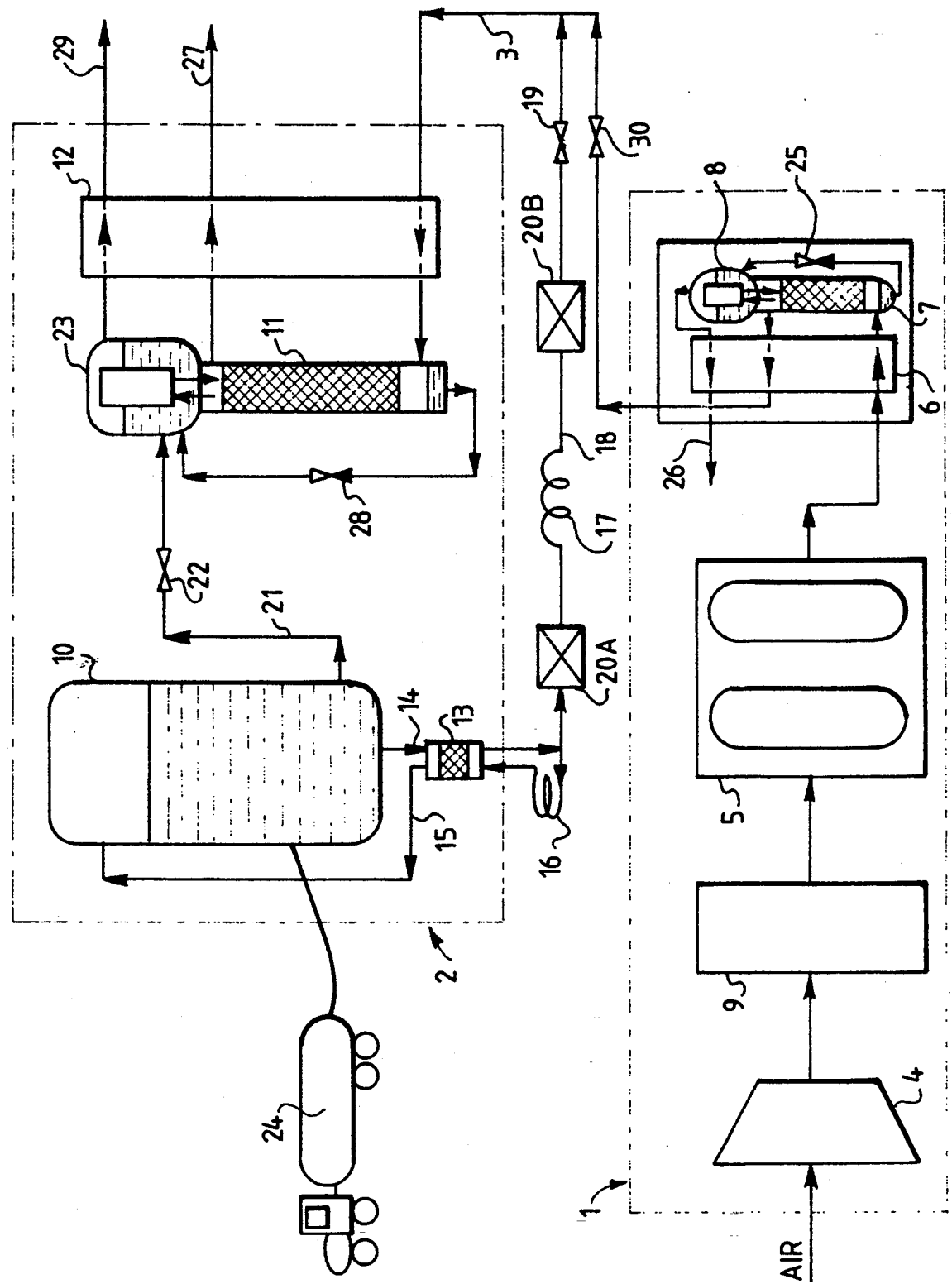

5,421,164

PROCESS AND INSTALLATION FOR THE PRODUCTION OF ULTRA-PURE NITROGEN UNDER PRESSURE

FIELD OF THE INVENTION

The present invention relates to a process and an installation for the production of ultra-pure nitrogen under pressure.

BACKGROUND OF THE INVENTION

The electronic industry requires the continuous supply of ultra-pure nitrogen, having typically a purity of the order of 1 to 100 ppb (parts per billion or $10^{-9}$) of impurity.

By the usual method, there is produced directly ultra-pure nitrogen in an air distillation installation called "HPN (High Purity Nitrogen) of electronic type". This comprises a nitrogen production column in which compressed air, purified with heating of hydrogen and carbon monoxide by catalysis and then purified by adsorption of water and carbon dioxide, is cooled to about its dew point, then introduced into the base of a distillation column having a number of theoretical plates sufficient to produce ultra-pure nitrogen at the head. The column is provided with a head condenser cooled by "rich liquid" (air enriched in oxygen) collected in a sump and expanded.

The installation is provided with liquefaction means of a portion of the ultra-pure nitrogen, and this liquid nitrogen is sent to standby storage. In the case of misfunction of the installation or of a loss of electric power, this storage permits ensuring the continuity of supply of ultra-pure nitrogen.

This technique has serious drawbacks:

if the outage is prolonged, the storage will be exhausted. There is accordingly needed a very large volume storage, which is quite costly: 200,000 liters to supply 1,000 Nm³/h for four days, which is not necessarily the maximum length of the outages in question;

no suitable solution exists if the storage is emptied, because one cannot have recourse to ordinary liquid nitrogen or nitrogen of medium purity, which is to say having a medium purity of the order of ppm (parts per million or $10^{-6}$);

when the storage is emptied following a breakdown of the installation, it is necessary once more to refill it, which takes quite a bit of time. For example, if the installation produces 7% of ultra-pure nitrogen in liquid form, two months are required to restore the reserve (200,000 liters) after four days of shutdown of the installation. During this period, the whole system is vulnerable.

SUMMARY OF THE INVENTION

The invention has for its object to provide a more reliable solution to the problem of continuous supply of ultra-pure nitrogen.

To this end, the invention has for its object a process for the production of ultra-pure nitrogen under pressure, characterized in that:

there is produced medium purity nitrogen substantially under the production pressure;

this nitrogen is sent to the base of a distillation column provided with a head condenser;

this head condenser is cooled with liquid from the base of the low pressure column and if desired a first flow of liquid nitrogen of medium purity contained in a storage reservoir;

ultra-pure nitrogen is withdrawn as product at the head of the column; and during periods of shutdown of the production of medium purity nitrogen and during the periods of excessive demand of ultra-pure nitrogen relative to this production, there is sent to the base of the column gaseous reserve nitrogen of medium purity obtained from the liquid nitrogen of said storage reservoir, and there is sent to the head condenser a second flow, greater than the first flow, of liquid nitrogen from this reservoir.

According to other characteristics:

in the case in which the medium purity nitrogen is produced by distillation of air, the air to be distilled is purified of hydrogen and carbon monoxide catalytically;

during said periods, liquid nitrogen is withdrawn from the reservoir, passed through a section of distillation column, a first portion of the liquid from this section of distillation column is vaporized, there is circulated upwardly the gas obtained from this distillation section, then it is if desired injected into the reservoir, and the rest of the liquid from the section of distillation column is vaporized to obtain said medium purity reserve nitrogen, which is sent to the base of the column;

the reserve nitrogen is purified of carbon monoxide before sending it to the base of the column;

the impure nitrogen vaporized in the head condenser is recovered as a second product.

The invention also has for its object an installation adapted to practicing such a process. This installation comprises:

apparatus for the production of gaseous nitrogen of medium purity;

a distillation column having a head condenser;

a conduit provided with an expansion valve connecting the base of the condenser to the head condenser; and a storage reservoir for liquid nitrogen of medium purity, and connecting means to connect selectively this reservoir on the one hand to the base of the column, and on the other hand to the head condenser.

BRIEF DESCRIPTION OF THE DRAWINGS

An example of an embodiment of the invention will now be described with reference to the accompanying drawing, whose single figure shows schematically a production installation of ultra-pure nitrogen according to the invention.

DETAILED DESCRIPTION OF THE INVENTION

The installation shown in the drawing comprises two principal parts, namely an apparatus 1 for the production of gaseous nitrogen of medium purity, typically of the order of 1 ppm impurity, and a purification apparatus 2, connected to the apparatus 1 by a conduit 3 conveying the medium purity nitrogen.

The apparatus 1, of the so-called HPN type, comprises in conventional manner an air compressor 4, an adsorption device 5, and a cold box containing a heat exchange line 6 and a distillation column 7 provided with a head condenser 8. In most of these conventional constructions of installations of the HPN type, the apparatus 1 comprises a catalytic reactor 9 disposed between the compressor 4 and the adsorber 5.

The apparatus 1 also comprises means (not shown) for cooling the same, which can be, according to the size of the apparatus, an expansion turbine in which rich liquid is vaporized, or a means for "bottle feeding", which is to say the introduction into the head of the column of a small flow of liquid nitrogen of medium purity from an appropriate storage.

The purification apparatus 2 comprises essentially a reservoir 10 for storage of liquid nitrogen of medium purity, typically of the order of 1 ppm impurity, a purification column 11 of the same general construction as column 7, and a heat exchange line 12.

Below the reservoir 10 is disposed a section 13 of distillation column whose upper liquid inlet is connected to the bottom of the reservoir by a conduit 14 and in which an upper gas outlet is connected to the top of the reservoir by a conduit 15 for pressurizing the reservoir. A lower liquid outlet from the section 13 is connected to a part of a first atmospheric vaporizer 16 whose outlet is connected to a lower gas inlet of the section 13, and on the other hand to a second atmospheric vaporizer 17. The outlet of this latter is connected to an intermediate point in the conduit 3 by a conduit 18 provided with a stop valve 19 and, if desired, a carbon monoxide filter 20A upstream of the vaporizer 17 or 20B downstream of this latter.

Another conduit 21 provided with a regulation valve 22 connects the bottom of reservoir 10 to the calandria of the head condenser 23 of the column 11.

The reservoir 10 can, when necessary, be replaced by a tank truck 24.

In normal operation, the reservoir 10 is used only to keep cold the column 11 by "bottle feeding", by means of a small flow rate of liquid nitrogen of the order of several percent of the production of nitrogen, and the valve 19 is closed. The air to be treated is compressed at 4 to a pressure a little greater than the production pressure of the ultra-pure nitrogen, purified of hydrogen and carbon monoxide at 9, purified of water and carbon dioxide at 5, and introduced into the cold box of the apparatus 1.

After cooling at 6 to about its dew point, the air is introduced into the base of the column 7, which produces at the head gaseous nitrogen of medium purity, reheated at 6 and then sent to the conduit 3, and which produces in the sump a rich liquid containing heavy impurities of the treated air. This rich liquid, after expansion in an expansion valve 25, is sent to the calandria of the head condenser 8 of the column. The vaporized rich liquid is reheated in 6 and then evacuated via a conduit 26 as residual gas of the installation. The nitrogen passages of the condenser 8 can be provided with collection means for light remaining impurities (helium and neon) and can send these latter to the calandria of the condenser for their evacuation with the vaporized rich liquid.

The nitrogen carried by the conduit 3 is cooled to about its dew point in 12 and introduced into the base of the column 11. This latter produces at its head ultra-pure nitrogen as product, which, after reheating in 12, is delivered via a conduit 27.

The reflux of the column 11 is obtained by slightly expanding in an expansion valve 28, for example by 1 bar, the liquid in the base of this column, and by introducing the expanded liquid into the calandria of the head condenser 23. This liquid, after vaporization, constitutes gaseous nitrogen of a purity slightly less than that of the medium purity nitrogen, for example with 1.5 ppm impurity, and can be recovered, after reheating in 12, via a conduit 29.

The apparatus 2 can thus produce about 30% of the flow entering through the conduit 3, in the form of ultra-pure nitrogen, and about 70% of this flow in the form of impure nitrogen, at a slightly lower pressure. By way of example, the pressures can be of the order of 10 bars for the medium purity nitrogen leaving the apparatus 1, 9 bars for the ultra-pure nitrogen, and 8 bars for the nitrogen withdrawn through conduit 29. It is to be noted that this pressure difference between the conduits 27 and 29 favors the safety of the piping if it is interconnected, the purest nitrogen being at the highest pressure.

In case of failure of the apparatus 1, or if the demand for ultra-pure nitrogen exceeds the capacity of this apparatus, the valves 19 and 22 are opened, and if desired a stop valve 30 provided in the conduit 3 is closed.

Liquid from the reservoir 10, purified of light products by its passage through the distillation section 13, is vaporized at 17, if desired purified from carbon monoxide in 20A or 20B, and introduced into the conduit 3 to undergo the same purification treatment as described above. The heavy impurities contained in the liquid nitrogen of reservoir 10 are eliminated in the column 11, and collected in the base of the column, while the light impurities still present are eliminated in the condenser 23 as explained above for the condenser 8.

During this operation, the cooling of the condenser 23 is augmented or totally provided by the liquid nitrogen of medium purity from the reservoir 10 via the conduit 21.

The reservoir 10 is continuously maintained at the necessary pressure thanks to the vaporizer 16, by means of a suitable regulation well known in the art and hence not shown.

It will be seen that the purification apparatus 2 permits guaranteeing in an economical way the continuity of delivery of ultra-pure nitrogen, and this in a very reliable way because the assembly of this apparatus is completely static and has no moving part. The only condition to be monitored is the continuous presence of ordinary liquid nitrogen, which is to say of medium purity, in the reservoir 10.

What is claimed is:

1. Process for the production of ultra-pure nitrogen under pressure, comprising producing gaseous nitrogen of medium purity under substantially a production pressure, sending this nitrogen to the base of a distillation column (11) provided with a head condenser (23), cooling said head condenser with liquid from the base of a column and a first flow of liquid nitrogen of medium purity contained in a storage reservoir (10), withdrawing ultra-pure nitrogen as a product from the head of said column, and during periods of shutdown of the production of medium purity nitrogen and during periods of excessive demand of ultra-pure nitrogen, sending to the base of the column gaseous reserve nitrogen under medium pressure obtained from the liquid nitrogen of said storage reservoir, and sending into the head condenser (23) a second flow, greater than the first flow, of liquid nitrogen from said reservoir.

2. Process according to claim 1, in which said nitrogen of medium purity is produced by distillation of air, wherein the air to be distilled is purified of nitrogen and carbon dioxide catalytically (9).

3. Process according to claim 1, wherein during said periods, liquid nitrogen is withdrawn from said reservoir (10), passed through a section (13) of distillation column, a first portion of the liquid from this section is vaporized, the gas obtained by this vaporization is caused to circulate upwardly through said distillation section and then introduced into the reservoir, and the rest of the liquid from said section (13) is vaporized to obtain said medium purity reserve nitrogen, which is sent to the base of the column (11).

4. Process according to claim 1, wherein the nitrogen of the reserve is purified of carbon monoxide (20A or 20B) before sending it to the base of the column (11).

5. Process according to claim 1, wherein impure nitrogen is recovered from the head condenser (23) as a second product.

6. Installation for the production of ultra-pure nitrogen under pressure, comprising apparatus (1) for the production of gaseous nitrogen of medium purity, said apparatus being fluidly connected to a distillation column (11) having a head condenser (23), a conduit provided with an expansion valve (28) connecting the base of the column to the head condenser, and a reservoir (10) for storage of liquid nitrogen of medium purity, first conduit means including a stop valve for fluidly connecting said reservoir to the base of the column, and second conduit means including a regulation valve for fluidly connecting said reservoir to the head condenser.

7. Installation according to claim 6, wherein said apparatus (1) for production of medium purity nitrogen comprises an air compressor (4), a catalytic reactor (9) for purification from hydrogen and carbon monoxide, an adsorption device (5) for purification from water and carbon dioxide, a column (7) for air separation by distillation producing medium purity nitrogen at its head, and a heat exchange line (6) ensuring by indirect heat exchange the cooling of the air to about its dew point and the heating of products leaving the separation column (7).

8. Installation according to claim 6, wherein there is connected with the storage reservoir (10) a section (13) of distillation column comprising an upper inlet for liquid connected to the bottom of the reservoir, an upper outlet for gas connected to the upper portion of the reservoir, a lower gas inlet, and a lower liquid outlet connected on the one hand via a first vaporizer (16) to the lower gas inlet and on the other hand via a second vaporizer (17) to the base of the column by said first conduit means (18).

9. Installation according to claim 6, wherein said first conduit means (18) connecting the reservoir to the base of the column comprises a filter (20A, 20B) for removing carbon monoxide from reserve nitrogen.

* * * * *